United States Patent Office 3,096,247
Patented July 2, 1963

3,096,247
INFECTIOUS RHINOTRACHEITIS VIRUS ATTENUATED IN LAMB CELL TISSUE CULTURES
Eben A. Slater, St. Joseph, Mo., assignor to Anchor Serum Company, Inc., St. Joseph, Mo., a corporation of Missouri
No Drawing. Filed Jan. 30, 1959, Ser. No. 790,071
5 Claims. (Cl. 167—78)

This invention relates to the prevention of bovine disease caused by the virus of infectious bovine rhinotracheitis.

At the present time the virus of infectious bovine rhinotracheitis is attenuated by repeated passage through bovine embryonic renal tissue culture cells to produce a vaccine. This process has the disadvantage that since bovines are the original host and the vaccine is a live vaccine, there is the danger that the vaccine might contain other infections commonly found in vaccines.

It is an object of the present invention to prepare an improved infectious bovine rhinotracheitis vaccine.

Another object is to prepare such a vaccine free from possible contamination with other organisms capable of attacking bovines.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by passage of the virus of infectious bovine rhinotracheitis, a plurality of times through lamb cells. Preferably lamb renal tissue culture cells are employed. Generally at least five passages through lamb cells are utilized. There is no upper limit on the number of passages although for convenience usually not over 125 passages are employed.

The attenuated virus can be injected into cattle parenterally. Unless otherwise stated all parts and percentages are by weight.

*Example 1*

The Ithaca strain of infectious bovine rhinotracheitis virus was rendered bacteriologically sterile and then a trypsinized ovine embryo renal tissue culture was prepared using as a propagation medium a mixture consisting of 80% Earle's salt solution, 10% inactivated calf serum and 10% lactalbumin hydrolysate. The culture tube was inoculated with the Ithaca strain of the virus and it was allowed to grow for 72 hours in the culture tube and then transferred to a second culture tube. This procedure was repeated for 50 passages through the ovine (lamb) tissue culture. The attenuated vaccine was made by taking the supernatant fluid, adding Naylor-Smith stabilizing media (60% by volume) and then freeze drying in conventional fashion. Other conventional stabilizing agents can also be employed to make the final vaccine.

Two calves were injected intramuscularly with the vaccine thus prepared and thirty-eight days later were challenged with the live unattenuated I.B.R. virus as were two controls. Temperatures and nasal aspirations were taken daily for five days after the challenge. The challenge response of the controls indicated temperature reactions associated with clinical I.B.R. The vaccinates failed to demonstrate any such response.

It has been found that in the standard serum neutralization test antibody levels in the vaccinated valves were well developed in every case by the third or fourth week indicating immunity to the virus.

*Example 2*

Similar results were obtained with a vaccine prepared by attenuation through 25 passages in lamb embryo renal tissue culture.

What is claimed is:
1. A process of attenuating infectious bovine rhinotracheitis virus comprising passing the virus from about 5 to 125 times in lamb tissue cells.
2. The process of claim 1 wherein the lamb tissue cells are lamb renal cells and the virus is passed about 25 to 50 times therein.
3. A process of attenuating infectious bovine rhinotracheitis virus of the Ithaca strain comprising passing the virus from about 5 to 125 times in lamb tissue cells.
4. A process of attenuating infectious bovine rhinotracheitis virus of the Ithaca strain comprising passing the virus from about 25 to 50 times in lamb renal cells.
5. A process of attenuating infectious bovine rhinotracheitis virus of the Ithaca strain comprising passing the virus about 50 times in lamb renal cells.

References Cited in the file of this patent
UNITED STATES PATENTS 2,934,473 York et al. _____ Apr. 26, 1960
2,941,925 York et al. _____ June 21, 1960

OTHER REFERENCES

Bauer, Med. Monateschr., vol. 3, pp. 452–454 (as obtained thru Bibliography of Res. in Tissue Culture, 1884–1950, vol. 1, p. 831, Academic Press, New York, 1953).
Gillespie, Amer. J. Vet. Res. 18, 530, 1957.
Gillespie, P.S.E.B.M., 1957, vol. 94, 740.
Schwarz, P.S.E.B.M., March 1958, pp. 680–682.